United States Patent [19]

Clecak et al.

[11] Patent Number: 4,585,310
[45] Date of Patent: Apr. 29, 1986

[54] ALIGNMENT LAYER ORIENTATION IN RASTER SCAN THERMALLY ADDRESSED SMECTIC LIQUID CRYSTAL DISPLAYS

[75] Inventors: Nicholas J. Clecak, San Jose; Robert J. Cox, Watsonville; Joseph S. Feng, San Jose; Jerry Leff, Saratoga, all of Calif.

[73] Assignee: International Business Machines Corporation, Armonk, N.Y.

[21] Appl. No.: 560,475

[22] Filed: Dec. 12, 1983

[51] Int. Cl.⁴ .................................................. G02F 1/13
[52] U.S. Cl. .................. 350/341; 350/350 S; 350/351
[58] Field of Search ............ 35/351, 341, 333, 35 OR, 35/356; 252/299.01

[56] References Cited

U.S. PATENT DOCUMENTS

| | | | |
|---|---|---|---|
| 3,655,269 | 4/1972 | Heilmeier | 350/333 |
| 3,834,729 | 9/1974 | Janning | 350/341 |
| 3,974,087 | 8/1976 | Gray et al. | 350/35 OR X |
| 4,099,857 | 7/1978 | Hareng et al. | 350/351 |
| 4,261,650 | 4/1981 | Sprokel | 350/341 |
| 4,277,147 | 7/1981 | Hareng et al. | 350/351 |
| 4,291,948 | 9/1981 | Crosscand et al. | 350/341 X |
| 4,422,732 | 12/1983 | Ditzik | 350/356 |

FOREIGN PATENT DOCUMENTS 0024318  3/1981  Japan .................................. 350/341

OTHER PUBLICATIONS

Barrall et al., "Liquid Crystal Mixtures" vol. 19, No. 4, Sep. 1976.
"The Application of GaAlAs Lasers to High-Resolution Liquid-Crystal Projection Displays" IBM Journal of Research and Development, vol. 26, No. 2, Mar. 1982, pp. 177-185, by A. G. Dewey and J. D. Crow.

*Primary Examiner*—John K. Corbin
*Assistant Examiner*—David Lewis
*Attorney, Agent, or Firm*—Joseph E. Kieninger; Joseph G. Walsh

[57] ABSTRACT

The orientation of the alignment layer in a raster-scanned thermally addressed smectic liquid crystal display device can be chosen relative to the writing orientation to accentuate a selected characteristic. A perpendicular alignment with respect to the scan direction produces uniformly written images in both scan directions to allow high quality bidirectional writing. In a preferred embodiment the liquid crystal cell includes a liquid crystal material comprising 4-octyloxy-4'-cyanobiphenyl 37.5%, 4-decyl-4'-cyanobiphenyl 36.8% weight percent and 4-undecyl-4'-cyanobiphenyl 25.7 weight percent.

4 Claims, 11 Drawing Figures

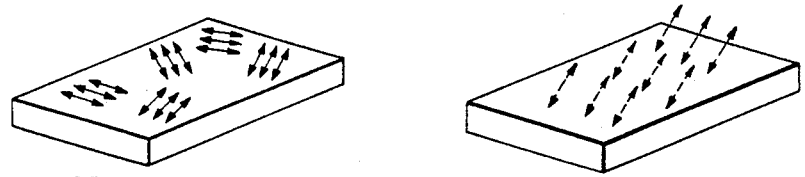
PRIOR ART
FIG.1A
PRIOR ART
FIG.1B
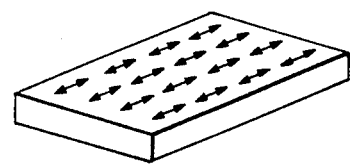
PRIOR ART
FIG.1C
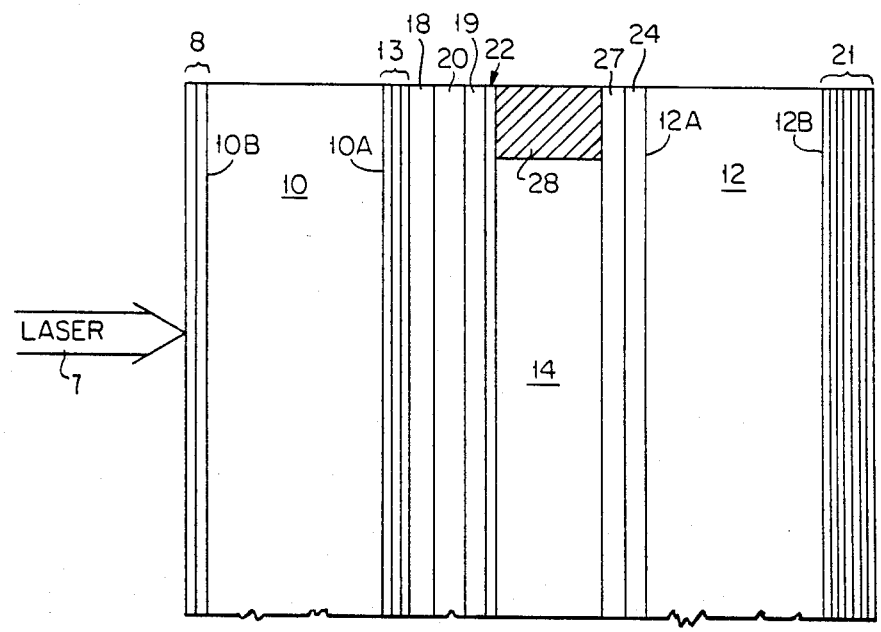
FIG.4

ALIGNMENT LAYER ORIENTATION IN RASTER SCAN THERMALLY ADDRESSED SMECTIC LIQUID CRYSTAL DISPLAYS

DESCRIPTION

1. Technical Field

This invention relates to an improved reflective raster scanned laser addressed liquid crystal cell, and more particularly a liquid crystal cell in which the alignment layer is oriented relative to the scanning raster.

2. Background Art

The alignment of liquid crystal molecules in liquid crystal devices is important for obtaining a high contrast ratio. The purpose of the alignment layers is to give a preferred direction to the liquid crystal molecules in the neighborhood of the surface. That is, it determines the angle the liquid crystal director makes with the plane of the alignment layer. The patent to Sprokel, U.S. Pat. No. 4,261,650, describes a method for producing uniform parallel alignment in liquid crystal cells and discusses random in-plane alignment as shown in FIG. 1A, alignment with the molecules being tilted out of the plane of the substrate surface as shown in FIG. 1B and parallel alignment in the plane of the substrate surface as shown in FIG. 1C. This patent did not discuss the angle between the raster scan direction and the liquid crystal director as projected onto the plane of the alignment layer.

Dewey et al in the IBM Journal of Research and Development, Vol. 26 No. 2, March 1982, pages 177–185 describes reflective raster-scanned laser addresed liquid crystal cells. In this paper the purpose of the alignment layers was to give a preferred direction of the liquid crystal molecules in the neighborhood of the surface in a manner similar to that described in the patent above. This article points out that the performance of the liquid crystal cell is highly dependent upon these aligning forces and that a strong uniform alignment such as shown in FIGS. 1B and 1C tend to realign the written scattered texture thereby giving excellent bulk erase properties. This article does not address the angle between the raster scan direction and the liquid crystal director as projected onto the plane of the alignment layer.

Numerous liquid crystal mixtures have been used for display devices. Liquid crystal mixtures are described in the IBM Technical Disclosure Bulletin Vol 19, No. 4, September 1976 page 1401 in which a mixture of 4-octyl-4'-cyanobiphenyl, and 4-n-decyl-4'-cyanobiphenyl is disclosed. Another mixture is described containing 4-n-octyloxy-4'-cyanobiphenyl, 4-n-decyl-4'-cyanobiphenyl, and 4-n-undecyl-4'-cyanobiphenyl. No percentages of this composition were disclosed.

SUMMARY OF THE INVENTION

It is a primary object of this invention to provide an improved raster-scanned thermally addressed liquid crystal display.

It is another object of this invention to provide a raster-scanned liquid crystal display having uniform contrast in the written image.

It is another object of this invention to provide a raster-scanned liquid crystal display in which written images are produced uniformly in both scan directions.

It is still another object of this invention to provide a raster-scanned liquid crystal display having maximized contrast in unidirectional writing.

These and other objects are accomplished with the orientation of the alignment layer in a thermally addressed smectic liquid crystal display device being chosen relative to the writing orientation to accentuate a selected characteristic. A perpendicular alignment with respect to the scan direction produces uniformly written images in both scan directions to allow high quality bidirectional writing. Parallel alignment maximizes the contrast in unidirectional writing. Antiparallel alignment increases the selective erase window and improves the resolution in unidirectionally written pages. In a preferred embodiment the liquid crystal cell includes a liquid crystal material comprising 4-octyloxy-4'-cyanobiphenyl 37.5%, 4-decyl-4'-cyanobiphenyl 36.8% weight percent and 4-undecyl-4'-cyanobiphenyl 25.7% weight percent.

Other objects of this invention will be apparent from the following detailed description, reference being made to the following drawings in which specific embodiments of the invention are shown.

BRIEF DESCRIPTION OF THE DRAWINGS

FIGS. 1A, B, and C are prior art liquid crystal cells showing random in-plane, uniform tilted and uniform in-plane alignment;

FIG. 4 is a liquid crystal cell in accordance with this invention.

DESCRIPTION OF THE PREFERRED EMBODIMENT

The orientation of the alignment layer in a thermally addressed smectic liquid crystal device, is chosen relative to the writing direction to accentuate a selected characteristic.

Figure 2A:
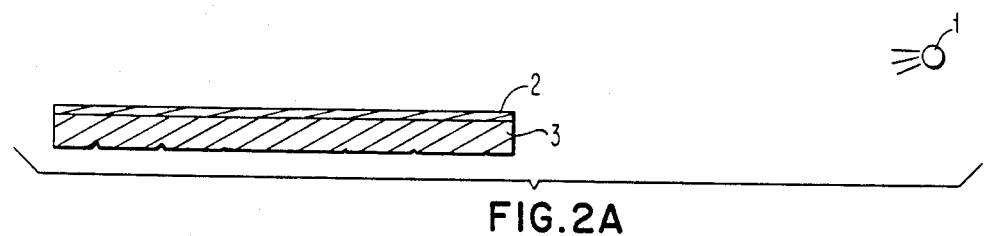
FIGS. 2A–C show the relationship between the evaporation source and the alignment layer.
Figure 2B:
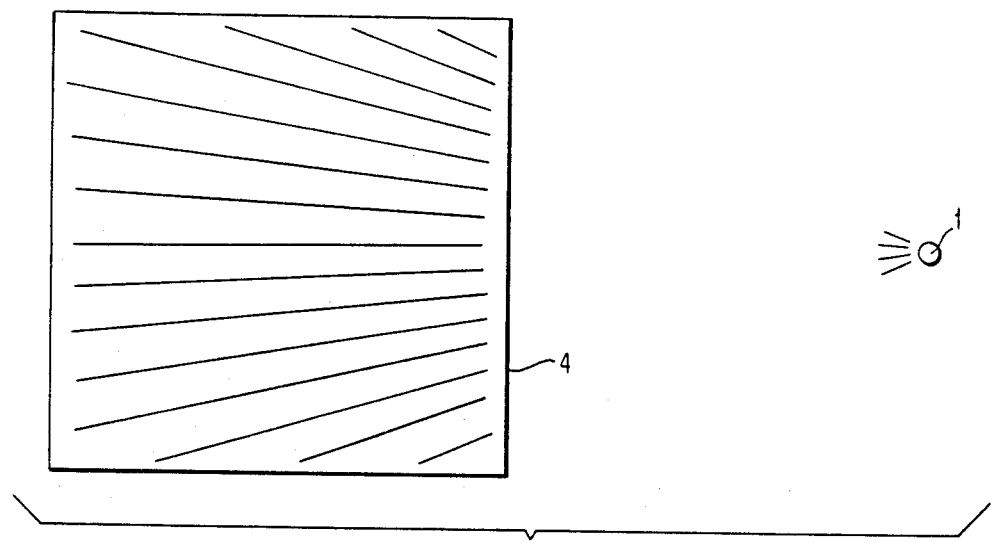
Figure 2C:
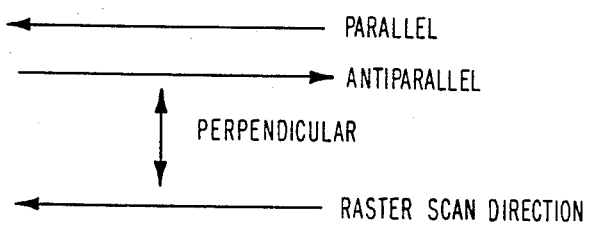

The alignment layer may be formed by vacuum evaporation of an inert inorganic material at a shallow oblique angle such as described in the patent to Janning, U.S. Pat. No. 3,834,792. This technique usually results in the formation of a textured dendritic structure with the axes of the dentrites formed in the general direction of the evaporation source 1 as shown in FIG. 2A. The microscopic structure of the alignment layer 2 is related to the source 1-to-substrate 3 orientation during deposition. This directionality is shown schematically in FIG. 2B for the special case of a point source aligned with the centerline of the substrate. In practice the lines are in fact more parallel than shown in FIG. 2B. If a rectilinear coordinate system coincident with the sides 4 of a rectangular (or square) substrate is imposed on the cell, there are three significantly different directions, shown in FIG. 2C as perpendicular, parallel and antiparallel.

Figures 3A, 3B, 3C, 3D:
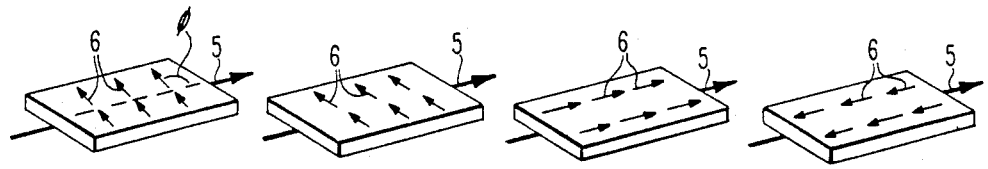
FIGS. 3A–3D show the relationship between the raster-scanned direction and the orientation of the liquid crystal directors.

As shown in FIG. 3A, the direction of the raster scan 5 forms an angle $\theta$ with the direction of the projection of the liquid crystal director 6 onto the plane of the alignment layer. The angle $\theta$ may vary from 0° to 180° C. In accordance with this invention, the angle $\theta$ is 90° as shown in FIG. 3B, an angle of 0° in FIG. 3C and an angle of 180° in FIG. 3D.

When the alignment layer is oriented so that the liquid crystal directors 6 are positioned perpendicular to the scan direction of the raster 5 as shown in FIG. 3B, uniformly written images in both scan directions allows high quality bidirectional writing thereby improving display performance by reducing writing time.

The parallel alignment where $\theta=0°$ as shown in FIG. 3C maximized and contrast in unidirectional writing. An antiparallel alignment, that is, where $\theta$ is 180° as shown in FIG. 3D increases the selective erase window and improves the resolution in unidirectionally written images. Parallel and antiparallel alignments can be combined in a single image if the display can write bidirectionally. One application of this capability would be to mix text and images with the text written in the high contrast mode and the pictures written in the high resolution mode.

A liquid crystal display cell suitable for use of this invention is shown in FIG. 4. A laser beam 7 strikes an antireflectance coating 8, designed to match the spectral output of the laser, which consists of a top layer of $SiO_2$ and a bottom layer of $TiO_2$ directly on the substrate surface 10B of substrate 10. Substrate 10 is typically a borosilicate glass. On substrate surface 10A is a three-layer antireflectance coating 13 designed to match the spectral output of the laser which consists of two layers of $TiO_2$ on either side of the middle layer of $SiO_2$. Layer 18 is a conductive metallic absorbing layer which is typically a metal such as chromium. A layer 20 is a reflective conductive electrode, for example, of alumium. Layer 19 is an insulating layer of $SiO_2$.

In accordance with this invention the alignment layer 22 is evaporated at an angle to the substrate to provide the alignment described in either FIGS. 3B, 3C or 3D. A spacing layer 28 of a material such as Mylar forms a cavity 14 which is filled with a liquid crystal mixture as will be hereinafter more fully described. Layer 27 is an insulating layer put down at 90°. Layer 24 is a transparent conductor electrode layer of a material such as indium tin oxide. Substrate 12 is a borosilicate glass and layer 21 is a broad band antireflectance coating for the visible spectrum that consists of a number of layers, for example, 7 to 9 layers, consisting of materials such as $TiO_1$, $SiO_2$, MgF and the like.

The preferred liquid crystal composition in the cavity 14 consists of a mixture of 37.5±0.5 weight % 4-octyloxy-4'-cyanobiphenyl, 36.8±0.5 weight percent 4-decyl-4'-cyanobiphenyl and 25.7±0.5 weight percent 4-undecyl-4'-cyanobiphenyl. The following table shows the criticality of the liquid crystal mixture composition. The three components of the composition cannot vary by more than ±0.5 weight percent. Concentrations that vary by more than that amount tend to give poor cell performance as far as the contrast and the presence of a ghost image are concerned.

| LIQUID CRYSTAL MIXTURES V. NEMATIC RANGE | | | |
|---|---|---|---|
| Example | Composition | Nematic Range | Cell Performance |
| 1 | C08 37.5% C10 36.8% C11 25.7% | 1 deg C | Excellent |
| 2 | C08 37.0% C10 37.3% C11 25.7% | 1.3 deg C | Fair |
| 3 | C08 37.0% C10 36.8% C11 26.2% | 1.4 deg C | Fair |
| 4 | C08 36.5% C10 37.8% C11 25.7% | 2 deg C | Poor |
| 5 | C08 36.5% C10 36.8% C11 26.7% | 2.2 deg C | Poor |
| 6 | C08 38.5% C10 36.8% C11 24.7% | 1.7 deg C | Poor |

C08 = 4-octyloxy-4'-cyanobiphenyl
C10 = 4-decyl-4'-cyanobiphenyl
C11 = 4-undecyl-4'-cyanobiphenyl Although preferred embodiments have been described, it is understood that numerous variations may be made in accordance with the principles of this invention.

We claim:

1. A reflective liquid crystal cell addressed by a scanning laser and having a first and second substrate being separated by a spacing member to form a cavity, said cell comprising
an inplane alignment layer on said first substrate, said alignment layer being oriented in a direction taken from the group consisting of perpendicular, parallel and antiparallel to the scanning direction of the laser wherein the orientation direction of the alignment layer determines the characteristics of the written image, and wherein said cell includes a liquid crystal material in said cavity, said material comprising 4-octyloxy-4'-cyanobiphenyl, 37.5%±0.5 weight percent, 4 decyl-4'-cyanobiphenyl 36.8±0.5 weight percent and 4-undecyl-4'-cyanobiphenyl 25.7±0.5 weight percent.

2. A cell as described in claim 1 wherein said alignment layer is oriented perpendicular to the scanning direction of the laser to produce a uniform written image in a bidirectionally scanned area.

3. A cell as described in claim 1 wherein said alignment layer is oriented parallel to the scanning direction of the laser to maximize the contrast in a unidirectionally scanned area.

4. A cell as described in claim 1 wherein said alignment layer is oriented antiparallel to the scanning direction of the laser to increase the selective erase window and to improve the resolution in the unidirectionally written image.

* * * * *